(12) United States Patent
Dev (10) Patent No.: US 9,645,880 B2
(45) Date of Patent: May 9, 2017

(54) SUPPORTABILITY FRAMEWORK FOR MOBILE SOFTWARE APPLICATIONS

(71) Applicant: SAP SE, Walldorf (DE)

(72) Inventor: Nipun Dev, Bangalore (IN)

(73) Assignee: SAP SE, Walldorf (DE)

( * ) Notice: Subject to any disclaimer, the term of this patent is extended or adjusted under 35 U.S.C. 154(b) by 12 days.

(21) Appl. No.: 14/525,689

(22) Filed: Oct. 28, 2014

(65) Prior Publication Data

US 2016/0077910 A1    Mar. 17, 2016

(51) Int. Cl.
*G06F 11/07* (2006.01)
*G06F 11/34* (2006.01)

(52) U.S. Cl.
CPC ........ *G06F 11/0793* (2013.01); *G06F 11/076* (2013.01); *G06F 11/0715* (2013.01); *G06F 11/0742* (2013.01); *G06F 11/0748* (2013.01); *G06F 11/0778* (2013.01); *G06F 11/0781* (2013.01); *G06F 11/0787* (2013.01); *G06F 11/34* (2013.01)

(58) Field of Classification Search
CPC ............. G06F 11/0793; G06F 11/0709; G06F 11/0751; G06F 11/0787; G06F 11/079; G06F 11/326; G06F 11/3409; G06F 11/3495

See application file for complete search history.

(56) References Cited

U.S. PATENT DOCUMENTS

| | | | | |
|---|---|---|---|---|
| 6,564,227 | B2 * | 5/2003 | Sakakibara | G06F 11/0709 |
| 8,266,253 | B2 * | 9/2012 | Soejima | H04L 67/02 |
| | | | | 709/219 |
| 8,276,023 | B2 * | 9/2012 | Van Riel | G06F 9/45533 |
| | | | | 714/47.1 |
| 2008/0209415 | A1 * | 8/2008 | Van Riel | G06F 9/45533 |
| | | | | 718/1 |
| 2009/0198549 | A1 * | 8/2009 | Kearns | G06Q 10/06 |
| | | | | 705/7.12 |
| 2013/0124908 | A1 * | 5/2013 | Gowin | G06F 11/0793 |
| | | | | 714/2 |
| 2013/0151709 | A1 * | 6/2013 | Luna | H04W 40/248 |
| | | | | 709/226 |
| 2013/0260734 | A1 * | 10/2013 | Jain | G06Q 30/0601 |
| | | | | 455/418 |

* cited by examiner

*Primary Examiner* — Nadeem Iqbal
(74) *Attorney, Agent, or Firm* — Jones Day (57) ABSTRACT

A system and a method for providing software supportability involve a server receiving a first electronic record from a client application on a mobile computing device. The first electronic record describes activity that occurred at the mobile computing device during a request sent from the client application to the server. The server creates a second electronic record that describes activity that occurred at the server while processing the request. The first electronic record and the second electronic record are stored in association with each other and can be analyzed to determine issues with performance or security. A diagnostic application, based on the stored first electronic record and the second electronic record, identifies at least one faulty component at the server or the mobile computing device to correct the identified at least one faulty component.

22 Claims, 5 Drawing Sheets

SUPPORTABILITY FRAMEWORK FOR MOBILE SOFTWARE APPLICATIONS

CROSS-REFERENCE TO RELATED APPLICATIONS

This application claims priority of IN Patent Application No. 4454/CHE/2014 filed on Sep. 11, 2014 which is herein incorporated by reference in its entirety.

FIELD OF THE INVENTION

The present invention relates to providing supportability for mobile software applications, through logging, tracing, diagnostics, and other activities that facilitate technical support in connection with the development, installation or monitoring of applications and/or devices involved in executing those applications.

BACKGROUND INFORMATION

Supportability has been implemented in varying degrees in the context of mobile computing. For example, some mobile operating systems include a logging feature, which is accessible to a developer or administrator. However, support functionality has not been uniformly adopted and is typically platform, application or device specific, so there is no way to access the same functions across different platforms, devices or applications. For this reason, support functions have traditionally been focused on the device itself rather than the system as a whole. Additionally, support functionality has not been integrated with analysis tools, application program interfaces and user interfaces that enable administrators, developers and other entities interested in recorded data to precisely control the manner in which the data is recorded and analyzed, for a plurality of applications or software components in a complex system landscape.

SUMMARY

In an example embodiment, a system and a method for providing software supportability involve a server receiving a first electronic record from a client application on a mobile computing device, wherein the first electronic record describes activity that occurred at the mobile computing device during a request sent from the client application to the server. The server creates a second electronic record that describes activity that occurred at the server while processing the request. The server stores the first electronic record and the second electronic record in association with each other. A diagnostic application, based on the stored first electronic record and the second electronic record, identifies at least one faulty component at the server or the mobile computing device to correct the identified at least one faulty component.

In an example embodiment, the server transmits at least one of the first electronic record and the second electronic record to the diagnostic application, which performs an analysis to determine, based on the least one of the first electronic record and the second electronic record, at least one of: a performance of the mobile computing device or the server, security issues that occurred during the request, and errors that occurred at the mobile computing device or the server during the request. The analysis may identify a component, located in the mobile computing device or the server and associated with a security issue or error, as being a faulty component, that is, a component to be fixed.

In an example embodiment, electronic records are associated with each other using an identifier of the client application.

In an example embodiment, electronic records are created using a shared format that is platform independent.

DETAILED DESCRIPTION

Example embodiments of the present invention relate to a system and methods for providing supportability for mobile applications. In an example embodiment, supportability may include, but is not limited to, logging, tracing, root cause analysis, monitoring & reporting, alerts, automated fixing of errors, landscape management, crash reporting and visualization of recorded data.

In an example embodiment, a system and a method involve end-to-end (E2E) tracing of activities at a device in the system, to create records concerning an application executed on the device, device status information, and system components used to process requests from the application. Although logging and tracing both involve recording, they are different in that logging involves recording data that is typically of interest to an end-user of the mobile device or a system administrator, whereas data recorded by tracing is primarily of interest to software developers when writing or testing the application, e.g., application specific data or server component specific data. Examples of logged data parameters and traced data parameters will be described.

In an example embodiment, logging and tracing meet the supportability requirements specified by SAP Active Global Support (AGS™). To that end, an example system according to the present invention provides for root cause analysis, which is based on four categories of analysis: E2E change analysis, E2E workload analysis, E2E exception analysis and E2E trace analysis. Trace analysis involves data recorded during tracing. Exception analysis involves statistical analysis of application exception data to, for example, determine exception trends or review exception situations after a system change has occurred. Exceptions may be grouped for analysis or display, e.g., a specified number of exceptions occurring within a specified time period. Workload analysis may involve using key performance indicators (KPIs) to assess the workload of specific components. Change analysis may provide statistical data on system changes, e.g., version updates. Root cause analysis may be implemented using SAP Solution Manager™ in combination with additional diagnostic tools such as Introscope, available from CA Wily Technology.

In an example embodiment, a system according to the present invention integrates support functionality into the system landscape directory (SLD) component of SAP NetWeaver™. SLD compatible software products are mapped to provide a comprehensive overview of the system landscape, which landscape may include, for example, a collection of related products used by a business customer or other entity. The landscape information is especially useful for product life cycle management. An example system is configured to register itself with SLD so that the landscape view of the system components is automatically updated whenever the system changes, e.g., when a new client application is installed or a configuration change is made at the server. Landscape information may identify a host server, server nodes, version numbers of installed software components, and other information about the system.

In an example embodiment, logs are created for both client side and server side activity. The client logs are stored in association with server side logs, by uploading the client logs to the server. A correlation identifier (Correlation ID) may be generated by a client application to be unique to that application. The Correlation ID is used to tag requests from the client application and follows the request as it travels from the client side to the server side and back, i.e., from end to end. A client log may be created whenever a call is initiated on the client side, e.g., a request for data on a backend data service such as a database, an Open Data Protocol (OData) service or a Web service. The call is tagged using the Correlation ID, which is parsed by each component as the call flows from end to end. The Correlation ID may be injected into the Hypertext Transfer Protocol (HTTP) header of each client request and forwarded by the application server to all servers or components involved in the workflow of the client request. Although the client and server logs are stored in association with each other, the system may differentiate between the client/server logs, e.g., based on the information contained therein, to enable pinpointing of the precise location in the system that is causing an issue.

In an example embodiment, end-to-end tracing records information contained in what is known as an SAP Passport. This information may include, for example, a Transaction ID that is unique for each request made by the client to the server. It may also include a Root Context ID that is unique for each session established between the client and the server. Similar to the Correlation ID, the Passport may be injected into the HTTP header of each client request.

The combination of client and server side logging helps pinpoint the exact system component that may be causing an issue. The logs capture the flow in which a particular mobile scenario was executed (including the order of execution), thereby assisting the end-user, developer or other interested entity to understand the processes executed by each system component and to identify technical or security issues, if any.

In an example embodiment, logs recorded by third party, legacy or other components that provide native logging functionality are tagged using the Correlation ID. The native logging is performed "under the hood" in that these components generally perform the logging without the knowledge of the end-user or administrator. Logs created in this manner may be stored in association with data recorded by a logging and tracing service according to an example embodiment of the present invention.

In an example embodiment, the system is configured to perform smart diagnostics, in which performance or security issues are detected and/or predicted based on recorded data and automatically fixed. For example, the system may monitor the number of threads used by an application, and increase the thread count upon reaching a threshold number of threads. Trigger events may cause alerts to be output to an end-user, developer or administrator, via a user interface (UI). Thus, alerts can be set based on counter values exceeding a predefined threshold to trigger actions such as sending a message to the end-user, the administrator or another entity, executing a diagnostic program or initiating recording.

In an example embodiment, recorded data are uploaded to an SAP HANA™ database to provide access to enhanced data processing and analytics.

In an example embodiment, the system communicates with third party diagnostic tools by sending crash logs to the diagnostic tools, which analyze the information contained in the crash logs to determine why an application crashed and how the problem can be fixed. The system may automatically send the crash logs to a third party diagnostic tool following a crash, using a third party crash reporting application that is integrated with the system. The third party crash reporting application generates a crash log after a crash has occurred, but before the application dies. The crash log may then be used for fixing the issue(s) that led to the crash. Thus, the system can be integrated with third party tools to proactively send crash data.

Figure 1:
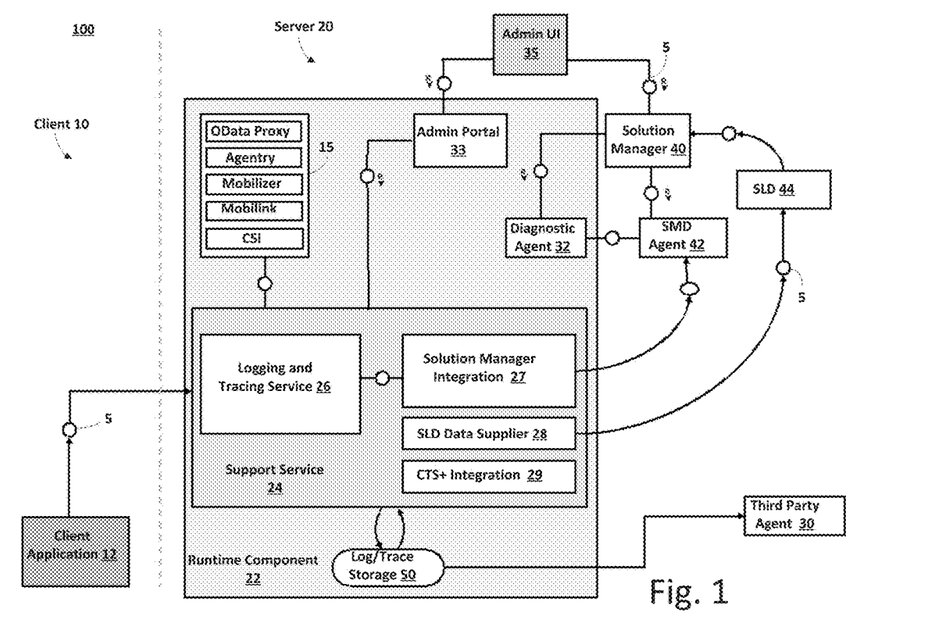
FIG. 1 is a block diagram of a system including server side components according to an example embodiment of the present invention.

FIG. 1 is a block diagram of a system 100 according to an example embodiment of the present invention. The system 100 includes a client 10, a server 20 and a third party agent 30. The client 10 may be any mobile computing device, e.g., a laptop, smartphone or a tablet computer. The client 10 includes a client application 12, which is configured to send requests that are executed at the server 20, e.g., requests for access to data exposed by a backend data service (not shown) to which the server 20 is connected. Communication between the various components in the system 100, including between the client application 12 and the server 20, may occur through Representational state transfer (REST) interfaces, which are shown as circles 5. Additional details of the client side components will be described in connection with FIG. 3.

On the server side, a runtime component 22 may include a support service 24 that implements support functionality including logging and tracing. The runtime component 22 may be a mobile-computing specific software application, e.g., running on SAP Mobile Platform™. The support service 24 may include a logging and tracing service 26, a Solution Manager integration component 27, an SLD data supplier 28, and a Change and Transport System (CTS) integration component 29. Components 15 installed on the server 20 may include, for example, an OData proxy component, an Agentry™ component, a Mobilizer™ component, a Mobilink™ component and a CSI component (CSI is a security software suite for auditing system data).

The logging and tracing service 26 is configured to receive client side logs generated by a client side logging component, in addition to generating server side logs based on data captured at the server 20, e.g., data from any of the components 15. The client logs and server logs may share the same file format, may be synchronized with the aid of the Correlation ID, and transmitted by the Solution Manager Integration component 27 to an instance 40 of SAP Solution Manager™ via an Solution Manager Diagnostics (SMD) agent 42. The SMD agent 42 may also transmit the logs to the diagnostic agent 32 for further analysis. Additionally or alternatively, the client/server logs may be stored in a log/trace storage database 50 and transmitted for analysis by the third party agent 30.

The SLD data supplier 28 periodically captures a snapshot of the system landscape. The snapshot may be timestamped and captured at predetermined time intervals and/or whenever a system component changes, thereby delivering up-to-date landscape information. The landscape information may be delivered in an Extensible Markup Language (XML) format or another standard format.

The CTS integration component 29 is used to transport changes, made in the client 10 and/or the server 20, to another system in the landscape, e.g., a development or testing system.

An administration portal 33 provides remote access to the support service 24 by an administrator UI 35, which is a user interface by which a developer or administrator can configure logging and tracing, e.g., by setting a severity level required for activity to be recorded. The administrator UI 35 may access logs in the storage 50, receive results of an analysis performed by the Solution Manager 40 and/or by the diagnostic agent 32, and may display the results in table, graph, list, spreadsheet or other formats. The severity level may be set for each component individually or to a default level, without requiring restarting of the server 20. Severity levels can range from recording all activity to only recording critical errors, e.g., errors that prevent the application 12 from executing properly or errors that compromise the security of the application 12. Logging may also be disabled entirely.

The administrator UI 35 may include at least one of the following features: displaying server logs and client logs simultaneously and/or concurrently to provide information about the cause of problematic system or application behavior, displaying different log types, switching display of records between human and computer readable formats, management of log levels for individual client and server components at runtime, identifying logs from client and server machines in the E2E pathway, manual filtering and searching of logs, merging logs across multiple servers, purging logs, viewing archived logs, enabling/disabling E2E tracing for the entire system, setting trace level, viewing and managing application trace records separately from client or server logs, view and managing security logs, configuring the Solution Manager 40, enabling/disabling or otherwise configuring the diagnostic agent 32, and controlling log or trace settings for individual client applications.

Figure 2:
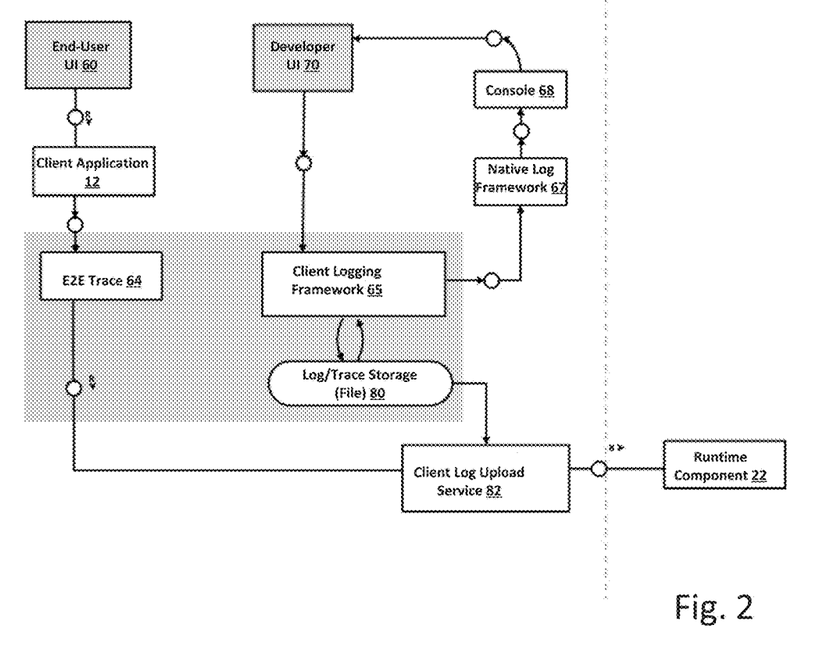
FIG. 2 is a block diagram of client side components according to an example embodiment of the present invention.

FIG. 2 is a block diagram of client side components in a client device, e.g., the client 10, according to an example embodiment of the present invention. The client device may include an end-user UI 60 that communicates with the client application 12 to trigger requests to the server 20 based on user input. Support components on the client side include an E2E trace component 64, a client logging framework 65 and a log/trace storage 80.

The E2E trace component 64 captures trace records in accordance with tracing requirements specified in the application 12.

The client logging framework 65 captures log data according to a logging (severity) level specified by the application 12. The severity level of the client logs may automatically be adjusted based on responses from the server 20. For example, a default severity level may not capture uniform resource locator (URL) errors. If a client requests access to a URL address that returns a URL error such as a 404 error, the severity level may be raised to capture subsequent URL errors. The code that implements the client logging framework 65 may be added to the client application 12 at any time during development. Since the client logging framework 65 can be separate from the code for the application 12 itself, logging can be added or removed without affecting the operation of the application 12.

The log/trace storage 80 stores log data from the client logging framework 65 and trace data from the E2E trace component, and is analogous to the log/trace storage 50 in the server 20. The log data and the trace data are tagged with the Correlation ID to enable synchronizing with server side logs/trace records.

A client log upload service 82 is configured to transmit client logs/trace records to the runtime component 22 at the server 20. Logs and trace records may be automatically uploaded at predefined intervals or based on predefined trigger events such as when an application switches to foreground execution from background execution. The log upload service 82 may also upload the details of the request as a business transaction (BTX) to the runtime component 22. Additionally, the client logs may be uploaded automatically following a trigger event such as when the application 12 crashes or each time the application 12 is launched. The logs may also be manually uploaded, e.g., following a crash. The log upload service 82 may, with the aid of the Correlation ID, automatically synchronize client logs and trace records uploaded to the server 20 with existing logs/trace records stored at the server 20. In addition to uploading the client logs, the client log upload service 82 may interface with a crash reporting application that generates a crash log, containing crash relevant information, after a crash has occurred, but before the application 12 dies.

The client 10 may include a native log framework 67 that creates logs independently of the client logging framework 65. The developer UI 70 may access the logs created by the native log framework 67, through a console 68 provided, for example, by a publisher of the client device's operating system.

In an example embodiment, log formats are based on a standard format, but tailored to mobile computing environments. Table 1 below is a list of example of server log parameters. Table 2 is a list of example of client log parameters.

TABLE 1

| | Server Log Parameters | | | |
|---|---|---|---|---|
| Field Name | Example value | | Default | Description |
| Version | 2 | | 2 | Logging API version This value is used for defining parsing |

TABLE 1-continued

Server Log Parameters

| Field Name | Example value | Default | Description |
| --- | --- | --- | --- |
| | | | procedure version. |
| DateTime | 2010 01 08 14:30:36:084 | | Date & time in format: YYYY MM DD HH:MM:SS:mmm |
| TimeZone | +6:30 | | Time zone in format +/-N:NN (where N is an integer number) |
| Severity | INFO | DEBUG, PATH, INFO, WARNING, ERROR, FATAL | Severity of the log record |
| SourceName | /System/Database | Location or Category name | If the log record was written using Category, then value is equal to that Category name. |
| | /System/Network | | If Location was in use, value is equal to the Location name. |
| | /System/Server /System/Security /System/UserInterface /System/Audit /System/AdminServices | | |
| MsgCode | web:0a0067. HttpCode | Empty String ("") | HTTP Code or a server error code |
| DC Component | ODP/Agentry | Empty string ("") | SMP component name |
| GUID | 000FFE93A54F002700000683000018B4012 28AEE | GUID value | Unique log record ID |
| Correlation ID | 000FFE93 | Correlation ID | ID generated by client for each request |
| Application | MyApplication | Empty string ("") | Application ID |
| Location | com.sap.mycomponent | Location name | Mostly, class or package name where the log record is created |
| User | Myuser | Empty string ("") | Mobile User Name |
| Session | MySession | Empty string ("") | Implicit properties from AS |
| Transaction | MyTransaction | Empty string ("") | Implicit properties from AS |
| RootContextID | 38fe6ce0639411dc96dd000ffe93a2aa | Empty string ("") | Read from SAP Passport (E2E trace) |
| TransactionID | 38fe6ce0639411dc96dd000ffe93a2ab | Empty string ("") | Implicit properties from AS Java |
| ConnectionID | 38fe6ce1389411dc96dd000ffe93a2cc | Empty string ("") | Implicit properties from AS Java |
| Counter | 20 | Empty string ("") | Implicit properties from AS Java |

TABLE 1-continued

Server Log Parameters

| Field Name | Example value | Default | Description |
|---|---|---|---|
| ThreadName | System [28] | Main | Thread name |
| MsgType | JAVA | PLAIN | Log record message types: PLAIN - message without arguments JAVA - message with arguments |
| ResourceBundle | MyResourceBundle | Empty string ("") | Resource bundle name |
| MsgText | Server {0} will be down in {1} minutes! | Empty string ("") | Log Message |
| MSGArgsNo | 2 | | Number of arguments in the message (e.g. 2) |
| MSGArg_1 | MyServer | | First message argument |
| MSGArg_2 | 15 | | Second message argument |
| MSGArg_n <= MSGArgsNo | . . . | | Next (N) message argument |

TABLE 2

Client Log Parameters

| Field Name | Example value | Default | Description |
|---|---|---|---|
| Version | 2 | 2 | Logging API version This value is used for defining parsing procedure version. |
| DateTime | 2010 01 08 14:30:36:084 | | Date & time in format: YYYY MM DD HH:MM:SS:mmm |
| TimeZone | +6:30 | | Time zone in format +/−N:NN (where N is an integer number) |
| Severity | INFO | ERROR | Severity of the log record |
| SourceName | /Client/Request /Client/API /System/Parser /Client/CoreServices . . . | Location or Category name | If the log record was written using Category, then value is equal to that Category name. If Location was in use, value is equal to the Location name. |
| MsgCode | Http Code or error code | Empty String ("") | Client code should start from 7xxx. |
| DC Component | OData/Agentry | Empty string ("") | — Application Type |
| GUID | 000FFE93A54F002700000683000018B4012 28AEE | GUID value | Unique log record ID |

TABLE 2-continued

Client Log Parameters

| Field Name | Example value | Default | Description |
| --- | --- | --- | --- |
| Correlation ID | 000FFE93 | Correlation ID | ID generated by client for each request sent to server |
| Application | MyApplication | Empty string ("") | Application ID |
| Location | com.sap.mycomponent | Location name | Mostly, class or package name where the log record is created |
| User | MyUser | Empty string ("") | Mobile User Name |
| RootContextID | 38fe6ce0639411dc96dd000ffe93a2aa | Empty string ("") | SAP Passport |
| TransactionID | 38fe6ce0639411dc96dd000ffe93a2ab | Empty string ("") | SAP Passport |
| ThreadName | System [28] | Main | Thread name |
| MsgType | JAVA | PLAIN | Log record message types: PLAIN - message without arguments JAVA - message with arguments |
| ResourceBundle | MyResourceBundle | Empty string ("") | Resource bundle name |
| MsgText | No Network Connection | Empty string ("") | Log Message |

Figure 3:
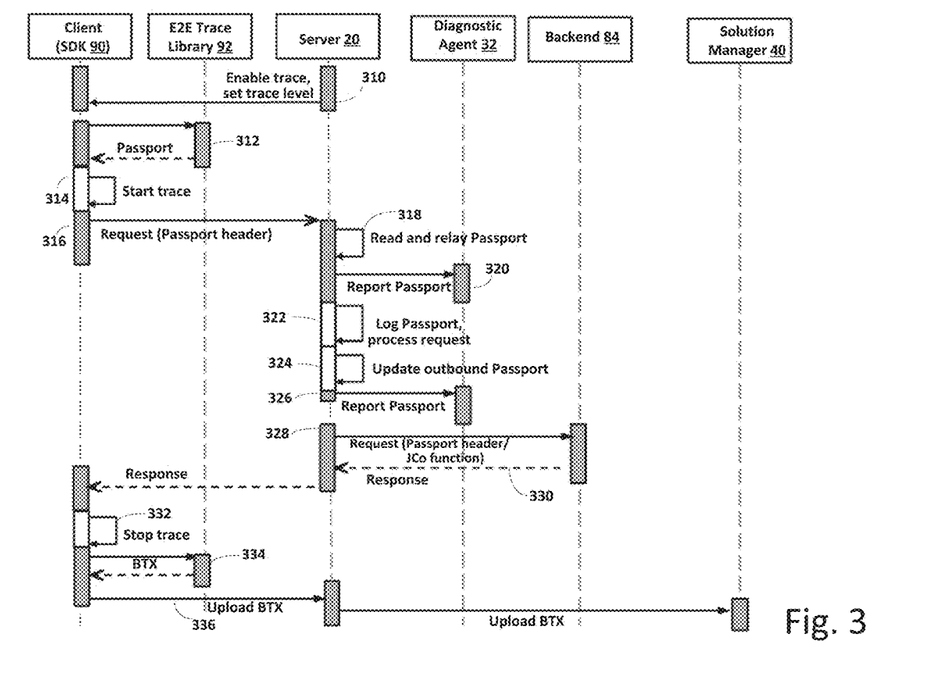
FIG. 3 is a flowchart of a method for performance tracing according to an example embodiment of the present invention.

FIG. 3 is a flowchart of a method 300 for performance tracing according to an example embodiment of the present invention. The method 300 may be performed using the system 100. Whereas E2E tracing is typically performed in a production system, performance tracing is primarily used during development or testing. Thus, performance tracing can assist developers in identifying issues and predicting performance in a production system, by measuring the application's performance on a development system or a testing system. At step 310, the client application, as configured through a software development kit (SDK) 90, enables performance tracing (which may be disabled by default) and sets the trace level in response to input from an administrator. The developer or administrator may perform this configuration through the admin UI 35 or another utility that interfaces with the server 20. Performance tracing enables the measurement and analysis of data parameters describing the individual hops in a mobile application scenario such as request, response, parse, serialization, database requests, etc. Measurement points may be defined by the developer for various points of interest in the request-response loop, for both online scenarios (when the application 12 communicates with the server 20) and offline scenarios (when the application 12 executes without server communication). The data parameters traced may include KPIs such as E2E request-response time, parse time, request creation, single read and update operations (online and/or offline), network time, initial load, database requests, synchronization, and time spent on the client device.

At step 312 the SAP Passport is created at the client application 12 with the aid of an E2E trace library 92, which may be packaged with the application 12 or subsequently installed, e.g., as a plug-in.

At step 314, the application 12 starts tracing and then sends a request to the server 20 (step 316). The request may include the Passport in addition to the Correlation ID, both of which can be added to an HTTP header of the request.

At step 318, the Passport is read and possibly relayed to additional servers for processing.

At step 320 the Passport is reported to the diagnostic agent 32 to enable the agent 32 to analyze the corresponding trace records.

At step 322, the server 20 logs the Passport by storing it together with trace data in the log/trace storage 50 while processing the request.

At step 324, the server 20 updates the outbound Passport, e.g., in response to a request from an OData proxy component. If updated, the Passport is reported again to the diagnostic agent 32 (step 326).

At step 328, the server 20 (or a relay server) transmits the request to a backend service 84 together with the Passport in an HTTP header. If the backend 84 is an Advanced Business Application Programming (ABAP™) server, the Passport may be passed using a Java Connector (JCo) function call.

At step 330, the backend 84 returns a response to the server 20, which relays the response to the client 10.

At 332, the application 12 stops tracing after receiving the response. The application 12 then creates a BTX based on the request and/or the response, with the aid of definitions in the E2E trace library 92 (step 334). The BTX may be formatted in XML or another standard format.

At step 336, the client 10 may upload the BTX to the Solution Manager 40 for analysis. When the BTX is received at the server 20, it may trigger an upload to the Solution Manager 40, e.g., in synchronization with uploading of corresponding logs, and the server 20 may notify the client when the upload occurs.

Figure 4:
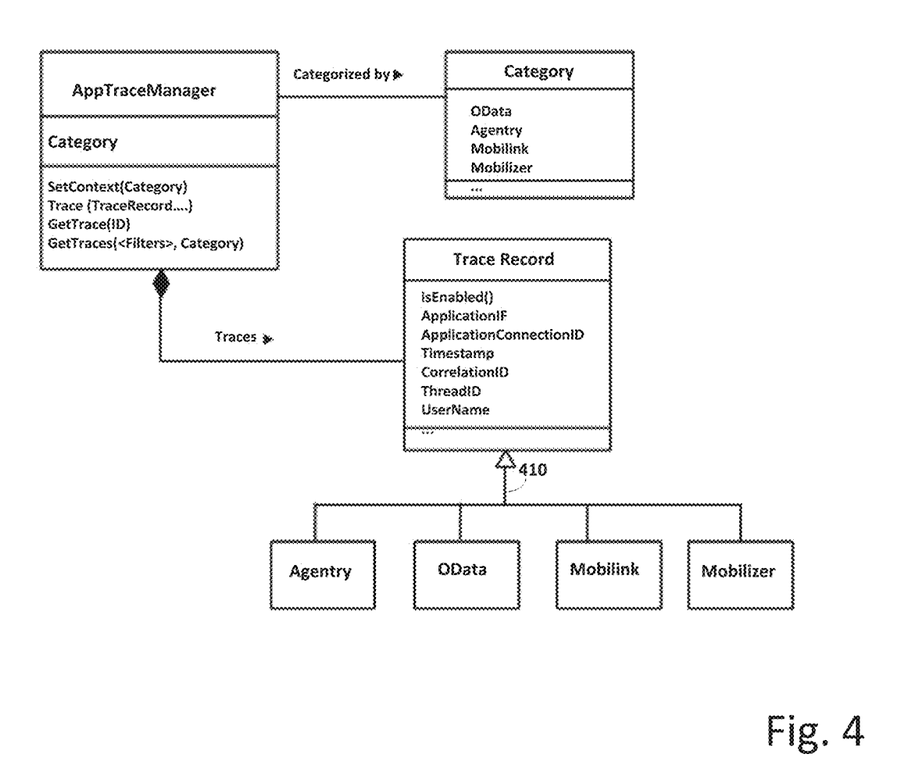
FIG. 4 is a flowchart showing how data is recorded and categorized during application tracing according to an example embodiment of the present invention.

FIG. 4 is a flowchart showing how data is recorded and categorized during application tracing, which is distinct from the E2E tracing and performance tracing described earlier. The recording described in connection with FIG. 4 provides a focused tracing option that enables developers to allocate storage (trace buckets) for specific components, applications, devices, etc., to obtain detailed raw data (e.g., binary output of an application or component) or managed information to identify issues, and to take appropriate steps to fix the issues. These traces can contain message data, payload, HTTP headers, Uniform Resource Indicators (URIs), or any custom or raw data, as requested by the developer user. Thus, in comparison to generalized logging, tracing produces a large amount of data. Therefore, trace records may be stored in the log/trace storage 50 with a bucket (defined by the component developer) for each component. Trace records may be identified using a Message ID or the Correlation ID. At step 410, data from any of the components 15 in FIG. 1 are collected to form a trace record including information such as an identifier of the application 12, a status flag indicating whether tracing is enabled for the application 12, the Correlation ID, and a timestamp. An application trace manager (AppTraceManager) program is used to specify which parameters are traced and to categorize the trace records for output. Trace records can be categorized by individual components as OData, Agentry™, Mobilink™ and Mobilizer™. Traces can also be categorized by application. For example, all trace records for the application 12 may be grouped together in storage. Thus, the developer can create customized trace records and access raw information, and the system 100 may provide support (in the form of custom logs or custom solutions to developer specified issues) for specific server components (Agentry™ OData, etc.) and/or specific applications.

Table 3 below is a list of example trace record parameters for an application that consumes OData. The system 100 may implement similar trace parameters for other types of applications such as Agentry™ or CSI.

TABLE 3

OData Trace Parameters

| Field | Data Type | Description |
| --- | --- | --- |
| Node | | Server Name |
| Correlation ID | GUID | Unique identifying the message for E2E. X-SAP-Correlation ID |
| ApplicationID | VARCHAR | Application Identifier |
| ApplicationConnectionID | VARCHAR | Application Connection Identifier |
| Timestamp | DATETIME | Creation Time |
| Username | VARCHAR | Application User |
| Request Type | VARCHAR | HTTP Method Name |
| URL | VARCHAR | OData service URL |
| Post Data (payload) | BINARY (RAW) | HTTP Request Body (optional) |
| Response Code | INT(4) | HTTP Response Code |
| Response Body (payload) | BINARY (RAW) | HTTP Response Body (optional) |
| Request Headers | LONGVARCHAR | Request HTTP Headers |
| Response Headers | LONGVARCHAR | Response HTTP Headers |
| Source | VARCHAR | Component raising the trace |
| Has Error | VARCHAR | Whether there is error during the cycle |
| Message | LONGVARCHAR | Message (Error/Info) |
| Thread ID | FLOAT | ID of thread creating the trace record |
| Application Type | SMALLINT | Kapsel or Native |
| Device Type | SMALLINT | iOS or Android or Windows 8 |
| TransactionID | VARCHAR | SAP Passport Transaction ID. The transaction ID is unique for each request made by the client to the server. |
| RootContextID | VARCHAR | SAP Passport Root Context ID. The Root Context ID is unique for each session established between the client and the server. Each session is a block that can include multiple requests from the client to the server. |

In an example embodiment, the logging and tracing service 26 records audit logs, which are separate from the client and server logs. Audit logs contain information describing security relevant events, i.e., any event that may affect the confidentiality, integrity and/or availability of the system 100. Examples of security relevant events include server start/stop, failed logins, failed authorization checks, start of critical transactions, and changes to critical system parameters. Similar to tracing, audit logging may be turned off by default. Access to audit logs may be restricted to authorized entities such as the administrator.

Table 4 below is a list of example audit log parameters. As with the example parameters in Tables 1 to 3, not all of the parameters listed need to be included in every log. However, the audit logs may include at least a timestamp of when the event occurred, a user ID associated with the event and, in cases where the client requests access to an external source, the source's IP address. The audit logs may be designed to comply with security regulations such as Public-Interest Litigation (PIL) security standards in India and similar regulations of other government entities. Various types of audit logs may be recorded to meet regulatory requirements. For example, a data read access log may capture attempts to access sensitive personal data in compliance with Section 254 of the Telecommunications Act of 1996, a configuration change log may capture changes to configuration data in compliance with Section 257 of the Communications Act of 1934, and a security event log may capture security relevant events in compliance with Section 215 of the Uniting and Strengthening America by Providing Appropriate Tools Required to Intercept and Obstruct Terrorism (USA PATRIOT) Act.

TABLE 4

Audit Log Parameters

| Field Name | Description | Logged by | Example Value |
|---|---|---|---|
| FormatVersion | Version of the audit log message format | server side | 2 |
| Account | The account taken from the client's certificate | server side | sap |
| Application | The application name taken from the client's certificate | server side | myapplication |
| Component | The component taken from the client's certificate | server side | web |
| NodeID | Tenant ID taken from the client's certificate (see also tenantId below) | server side | null |
| Permissions | Permission of the client taken from the client's certificate. | server side | setUser, setTenant |
| Hostname | The hostname of the VM for which the client certificate was issued. This field is also taken from the client certificate | server side | vsa146628 |
| Timestamp | The time when the client side "log" method was invoked. | client side | 2013-06-12T08.51.35.959+0000 |
| MessageId | Unique message ID. It can be used to distinguish duplicated audit log message entry in case of some network issues when retry mechanism is triggered. | client side | 23cc4-13f37938076-2 |
| Category or Sub-Category | The Category of the audit log message. It is formed by the audit log message factory depending on the used audit log message sub interface. Also a custom sub-category can be provided by the application itself when invoking the "log" method. | client side | audit.data-access.my-sub-category |
| Location | This is also specified by application itself and it is for debugging purposes only. The audit log framework could also put this automatically but it would be more time consuming operation. | client side | com.sap.app.mayapp.MyClass |
| correlation_id | Currently not used. Reserved for Single Activity Trace. Empty string is provided. | client side | <empty> |
| IP_Address | This is the IP address determined by the client library itself. | client side | 10.20.30.100 |
| User | The user name acting on the client side. This parameter is taken from the thread locale, it is provided by the security bundle of the runtime. After the "@" | client side | I012345@saml2_idp:accounts.sap.com |

TABLE 4-continued

Audit Log Parameters

| Field Name | Description | Logged by | Example Value |
|---|---|---|---|
| | sign is an authentication provider that has authenticated this user. | | |

Figure 5:
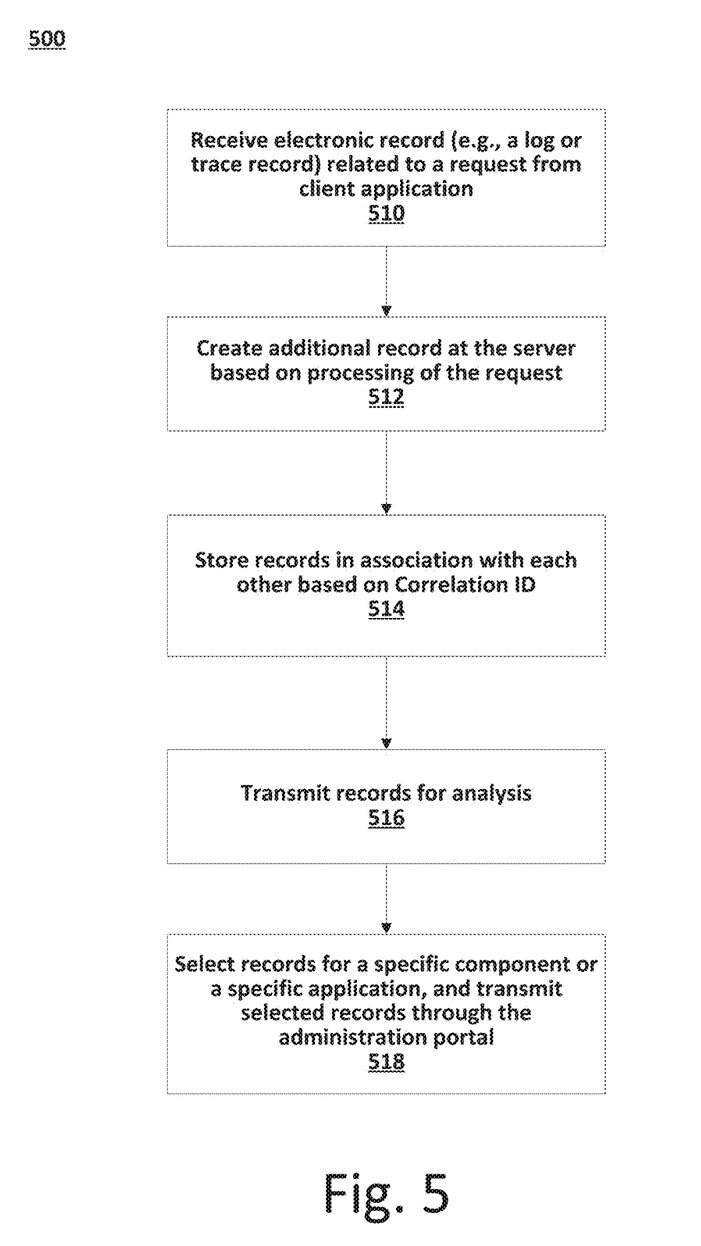
FIG. 5 is a flowchart of a method for providing supportability according to an example embodiment of the present invention.

FIG. 5 is a flowchart of a method 500 for providing supportability according to an example embodiment of the present invention. The method 500 may be performed using the system 100. At step 510, the server 20 receives an electronic record from the client application 12. The electronic record may be a client log, a trace record or any other record created at the client 10.

At step 512, the server 20 creates an additional record based on processing of a request from the client application 12.

At step 514, the server 20 stores the additional record in association with any records associated with the same request, based on the Correlation ID. This may include the record from step 510.

At step 516, the server 20 transmits stored records for analysis by the Solution Manager 40, the diagnostic agent 32 and/or the third party agent 30. The server 20 may transmit the records in real-time, periodically in batches of a pre-defined number of records, at predefined intervals, after each request is fully processed, based on trigger events, or on demand. The analysis results may be reported directly to the Admin UI 35. Alternatively or additionally, the results can be transmitted to the server 20 for storage and subsequent access by the Admin UI 35.

At step 518, the server 20 transmits selected records that share the same category for output to the administration portal 33. As mentioned earlier, records may be categorized by application or by component (e.g., OData, Agentry™, CSI, etc.). The server 20 may transmit these selected records in response to a request from the Admin UI 35.

In an example embodiment, the system 100 may perform smart diagnostics by detecting and automatically fixing predefined error conditions and other issues based on analysis results from one or more of the Solution Manager 40, the diagnostic agent 32, the third party agent 30 or another diagnostic tool. Automated fixing may include, for example, load balancing (distributing work load from the client application across different servers or other processing components), resource management (e.g. increasing or reducing the number of threads or the amount of memory allocated to the client application 12), security management (e.g., locking sensitive data from being accessed or blocking requests from unauthorized applications or client devices) and other measures that the developer or the administrator can specify.

Independent of whether the system 100 attempts to fix detected issues, analysis results may be monitored and reported to the developer or administrator, e.g., via the Admin UI 35. Reporting may involve, for example, statistical or other information on resource usage, software component usage, execution flows, cluster activity (where requests from the client application 12 are processed by one or more servers in a cluster), and database activity (e.g., access to a backend database).

In an example embodiment, the system 100 may perform under the hood logging in addition to providing a standard logging format for all the components in the system, including third party, open source or legacy components. The third party, open source or legacy components may include their own native logging/tracing methods and different recording formats. The system 100 may include a tool with an application program interface to native logging/tracing processes, so that native logs/traces can be analyzed and/or reported together with the logs/traces created through the methods described above. To standardize the different recording formats, the system 100 may convert the native logs/traces into the same format as the earlier described client and server logs or trace records, for example, by adding the Correlation ID and using a shared file format such as an XML format to store all the logs/traces in the system. Thus, the native logs/traces can be incorporated into an E2E scenario description.

An example embodiment of the present invention is directed to one or more processors, which can be implemented using any conventional processing circuit and device or combination thereof, e.g., a CPU of a Personal Computer (PC) or a mobile computer or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a non-transitory, hardware computer-readable medium, e.g., as described above, on which are stored instructions executable by a processor to perform any one or more of the methods described herein.

An example embodiment of the present invention is directed to a method, e.g., of a hardware component or machine, of transmitting instructions executable by a processor to perform any one or more of the methods described herein.

The above description is intended to be illustrative, and not restrictive. Those skilled in the art can appreciate from the foregoing description that the present invention may be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings and specification. Further, steps illustrated in the flowcharts may be omitted and/or certain step sequences may be altered, and, in certain instances multiple illustrated steps may be simultaneously performed.

What is claimed is:

1. A method for providing software supportability, comprising:
   at a server, receiving a first electronic record from a client application on a mobile computing device, wherein the first electronic record describes activity that occurred at the mobile computing device during a request sent from the client application to the server;
   at the server, creating a second electronic record that describes activity that occurred at the server while processing the request;
   storing the first electronic record and the second electronic record in association with each other;
   based on the stored first electronic record and the second electronic record, identifying at least one faulty component at the server or the mobile computing device; and
   executing a diagnostic application to correct the identified at least one faulty component;
   wherein:
      a correlation identifier (ID) is generated by the client application which uniquely identifies the client application in relation to other client applications;
      calls from the client application are tagged with the correlation ID and the correlation ID is maintained by the server when replying to the calls;
      the activity described in the first electronic record and the activity described in the second electronic record both refer to the correlation ID.

2. The method of claim 1, further comprising:
   transmitting at least one of the first electronic record and the second electronic record to the diagnostic application to determine, based on the least one of the first electronic record and the second electronic record, at least one of:
      a performance of the mobile computing device or the server, security issues that occurred during the request, and
      errors that occurred at the mobile computing device or the server during the request.

3. The method of claim 1, wherein the request is processed by at least one of a plurality of software components at the server, the method further comprising:
   creating additional electronic records describing activity at the at least one of the plurality of software components during processing of the request; and
   storing the additional electronic records in association with the first electronic record and the second electronic record, using the identifier.

4. The method of claim 1, wherein the request is processed by a backend service connected to the server, the method further comprising:
   creating an additional electronic record describing a response of the backend service to the request; and
   storing the additional electronic record in association with the first electronic record and the second electronic record, using the identifier.

5. The method of claim 4, wherein the first electronic record, the second electronic record and the at least one additional electronic record collectively describe, step by step, activity that occurred at each component or device that processes the request, including activity during the response of the backend service and activity during transmission of the response to the client application.

6. The method of claim 1, further comprising:
   storing the first electronic record and the second electronic record in a user specified location that is reserved for records associated with one of a specific software component of the server and the client application,
   wherein the first electronic record and the second electronic record capture user requested information including at least one of message data, payload, Hypertext Transfer Protocol (HTTP) headers, Uniform Resource Indicators (URIs) and raw data.

7. The method of claim 1, wherein the first electronic record and the second electronic record are created using a shared format that is platform independent, and wherein contents of the first electronic record and the second electronic record indicate a location where the respective record was created.

8. The method of claim 1, further comprising:
   outputting data in the first electronic record and the second electronic record that describe a flow of execution of the request.

9. The method of claim 1, further comprising:
   converting one of the first electronic record and the second electronic record so that the first electronic record and the second electronic record share the same format,
   wherein the one of the first electronic record and the second electronic record is created using a native recording process that creates electronic records in a different format than a process by which the other of the first electronic record and the second electronic record is created.

10. The method of claim 1, further comprising:
   detecting a user-defined error based on the at least one of the first electronic record and the second electronic record; and
   automatically fixing the error.

11. A system for providing software supportability, comprising:
   a mobile computing device including a client application;
   a server that processes a request from the client application, wherein:
   the mobile computing device creates a first electronic record that describes activity that occurred at the mobile computing device during the request,
   the server creates a second electronic record that describes activity that occurred at the server while processing the request, and
   the server stores the first electronic record and the second electronic record in association with each other; and
   a diagnostic application that, based on the stored first electronic record and the second electronic record, identifies at least one faulty component at the server or the mobile computing device to correct the identified at least one faulty component;
   wherein:
      the server stores the first electronic record and the second electronic record in a user specified location that is reserved for records associated with one of a specific software component of the server and the client application; and
      the first electronic record and the second electronic record capture user requested information including at least one of message data, payload, Hypertext Transfer Protocol (HTTP) headers, Uniform Resource Indicators (URIs) and raw data.

12. The system of claim 11, wherein:
the server transmits at least one of the first electronic record and the second electronic record to the diagnostic application, which determines, based on the least one of the first electronic record and the second electronic record, at least one of:
a performance of the mobile computing device or the server,
security issues that occurred during the request, and
errors that occurred at the mobile computing device or the server during the request.

13. The system of claim 11, wherein the first electronic record and the second electronic record are associated using an identifier of the client application.

14. The system of claim 13, wherein:
the server includes a plurality of software components, at least one of which processes the request;
the server creates additional electronic records describing activity at the at least one of the plurality software components during processing of the request; and
the server stores the additional electronic records in association with the first electronic record and the second electronic record, using the identifier.

15. The system of claim 13, wherein the identifier is generated by the client application and transmitted with all requests from the client application to the server.

16. The system of claim 13, wherein:
the request is processed by a backend service connected to the server; and
the server creates an additional electronic record describing a response of the backend service to the request; and
the server stores the additional electronic record in association with the first electronic record and the second electronic record, using the identifier.

17. The system of claim 16, wherein the first electronic record, the second electronic record and the at least one additional electronic record collectively describe, step by step, activity that occurred at each component or device that processes the request, including activity during a response to the request of the backend service and activity during transmission of the response to the client application.

18. The system of claim 11, wherein the first electronic record and the second electronic record are created using a shared format that is platform independent, and wherein contents of the first electronic record and the second electronic record indicate a location where the respective record was created.

19. The system of claim 11, wherein the system outputs data in the first electronic record and the second electronic record that describe a flow of execution of the request.

20. The system of claim 11, wherein:
the server converts one of the first electronic record and the second electronic record so that the first electronic record and the second electronic record share the same format; and
the one of the first electronic record and the second electronic record is created using a native recording process that creates electronic records in a different format than a process by which the other of the first electronic record and the second electronic record is created.

21. The system of claim 11, wherein the system detects a user-defined error based on the at least one of the first electronic record and the second electronic record, and automatically fixes the error.

22. A method for providing software supportability, comprising:
at a server, receiving a first electronic record from a client application on a mobile computing device, wherein the first electronic record describes activity that occurred at the mobile computing device during a request sent from the client application to the server;
at the server, creating a second electronic record that describes activity that occurred at the server while processing the request;
storing the first electronic record and the second electronic record in association with each other; and
converting one of the first electronic record and the second electronic record so that the first electronic record and the second electronic record share the same format;
wherein the one of the first electronic record and the second electronic record is created using a native recording process that creates electronic records in a different format than a process by which the other of the first electronic record and the second electronic record is created.

* * * * *